United States Patent
Borkovec et al.

(10) Patent No.: US 10,869,505 B2
(45) Date of Patent: Dec. 22, 2020

(54) ELECTRONIC CIGARETTE WITH MULTICAMERAL LIQUID RESERVOIR

(71) Applicant: Fontem Holdings 1 B.V., Amsterdam (NL)

(72) Inventors: Vaclav Borkovec, Hamburg (DE); Lutz Deichmann, Hamburg (DE)

(73) Assignee: Fontem Holdings 1 B.V., Amsterdam (NL)

( * ) Notice: Subject to any disclaimer, the term of this patent is extended or adjusted under 35 U.S.C. 154(b) by 260 days.

(21) Appl. No.: 15/766,732

(22) PCT Filed: Oct. 11, 2016

(86) PCT No.: PCT/EP2016/074322
§ 371 (c)(1),
(2) Date: Apr. 6, 2018

(87) PCT Pub. No.: WO2017/064051
PCT Pub. Date: Apr. 20, 2017

(65) Prior Publication Data
US 2018/0310621 A1    Nov. 1, 2018

(30) Foreign Application Priority Data
Oct. 15, 2015   (EP) .................................... 15190030

(51) Int. Cl.
*A24F 47/00*   (2020.01)
*A24B 15/167*   (2020.01)
(Continued)

(52) U.S. Cl.
CPC .......... *A24F 47/008* (2013.01); *A24B 15/167* (2016.11); *A24D 1/002* (2013.01);
(Continued)

(58) Field of Classification Search
CPC ..................................................... A24F 47/008
See application file for complete search history.

(56) References Cited

U.S. PATENT DOCUMENTS

| | | | |
|---|---|---|---|
| 5,785,688 A | * | 7/1998 | Joshi ................. A61M 5/14593 604/132 |
| 2014/0000638 A1 | | 1/2014 | Sebastian et al. |

(Continued)

FOREIGN PATENT DOCUMENTS

| | | |
|---|---|---|
| CN | 100381083 C | 4/2008 |
| CN | 104323429 A | 2/2015 |

(Continued)

*Primary Examiner* — Eric Yaary
*Assistant Examiner* — Jennifer A Kessie
(74) *Attorney, Agent, or Firm* — Dykema Gossett PLLC

(57) ABSTRACT

The present invention concerns an electronic smoking device that includes a battery portion (12) comprising a battery (18), an atomizer/liquid reservoir portion (14) comprising a multicameral liquid reservoir (34), and an atomizer (26) operable when connected to the battery (18) to atomize liquid stored in the multicameral liquid reservoir (34). The multicameral liquid reservoir (34) comprises a first chamber (202) comprising an unflavored fluid, a second chamber (204) comprising a flavored fluid, the first chamber (202) and the second chamber (204) being disposed in communication with each other via an opening (206), and a plurality of reservoir walls (208) enclosing the two chambers. A portion of the plurality of reservoir walls (208) enclosing the second chamber (204) comprising a flexible portion (40), the flexible portion (40) when acted upon causing the flavored fluid to migrate from the second chamber (204) to the first chamber (202) through the opening (206).

15 Claims, 6 Drawing Sheets

(51) Int. Cl.
  *A24D 1/00*   (2020.01)
  *B65D 81/32*  (2006.01)
  *B65D 83/00*  (2006.01)
  *F16K 15/00*  (2006.01)

(52) U.S. Cl.
  CPC ..... *B65D 81/3261* (2013.01); *B65D 83/0055* (2013.01); *F16K 15/00* (2013.01)

(56) References Cited

U.S. PATENT DOCUMENTS

2014/0060556 A1*  3/2014  Liu ................... A24F 47/008
                                                      131/329
2014/0166029 A1   6/2014  Weigensberg et al.
2018/0297048 A1* 10/2018  Ricketts .............. B05B 11/0081

FOREIGN PATENT DOCUMENTS

| CN | 104540406 A   | 4/2015 |
| CN | 104812259 A   | 7/2015 |
| CN | 104853632 A   | 8/2015 |
| CN | 204540828 U   | 8/2015 |
| EP | 1618803 A1    | 1/2006 |
| WO | 2014115324 A1 | 7/2014 |
| WO | 2015013329 A1 | 1/2015 |

* cited by examiner

_US 10,869,505 B2_

ELECTRONIC CIGARETTE WITH MULTICAMERAL LIQUID RESERVOIR

FIELD OF INVENTION

The present invention relates generally to electronic smoking devices and in particular electronic cigarettes. More specifically, the present invention relates to electronic smoking devices comprising a multicameral liquid reservoir capable of delivering either flavored or unflavored vapor.

BACKGROUND OF THE INVENTION

An electronic smoking device, such as an electronic cigarette (e-cigarette), typically has a housing accommodating an electric power source (e.g. a single use or rechargeable battery, electrical plug, or other power source), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device, which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

Currently the users of electronic cigarettes can enjoy them either with a vapor that comprises flavor or with vapor that is devoid of flavor. Currently available electronic cigarettes do not allow a user to add flavor mid-vaping or to customize its experience as desired by adding flavor only in the amount and intensity the user wants to.

SUMMARY OF THE INVENTION

In accordance with one aspect of the present invention there is provided an electronic cigarette, comprising a battery portion comprising a battery, an atomizer/liquid reservoir portion comprising a multicameral liquid reservoir, and an atomizer operable when connected to the battery to atomize liquid stored in the multicameral liquid reservoir. The multicameral liquid reservoir comprises a first chamber comprising an unflavored fluid, a second chamber comprising a flavored fluid, the first chamber and the second chamber being disposed in communication with each other via an opening. The multicameral liquid reservoir also comprises a plurality of reservoir walls enclosing the first and second chambers. A portion of the plurality of reservoir walls enclosing the second chamber comprise a flexible portion, the flexible portion when acted upon causing the flavored fluid to migrate from the second chamber to the first chamber through the opening.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, same element numbers indicate same elements in each of the views.

DESCRIPTION OF THE PREFERRED EMBODIMENTS

Figure 1:
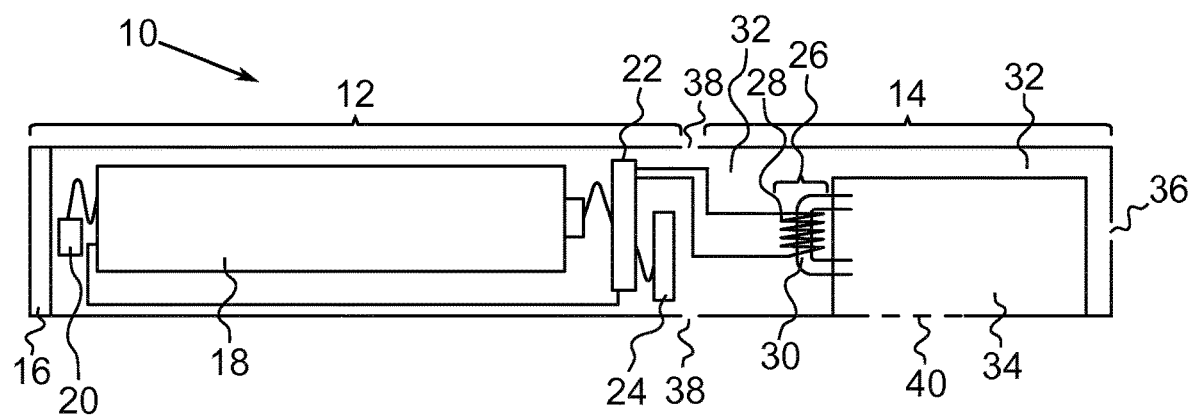
FIG. 1 is a schematic cross-sectional illustration of an e-cigarette.

Throughout the following, an electronic smoking device will be described with reference to an e-cigarette. As is shown in FIG. 1, an e-cigarette 10 typically has a housing comprising a cylindrical hollow tube having an end cap 16. The cylindrical hollow tube may be a single-piece or a multiple-piece tube. In FIG. 1, the cylindrical hollow tube is shown as a two-piece structure having a battery portion 12 and an atomizer/liquid reservoir portion 14. Together the battery portion 12 and the atomizer/liquid reservoir portion 14 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The battery portion 12 and atomizer/liquid reservoir portion 14 are typically made of metal, e.g. steel or aluminum, or of hardwearing plastic and act together with the end cap 16 to provide a housing to contain the components of the e-cigarette 10. The battery portion 12 and an atomizer/liquid reservoir portion 14 may be configured to fit together by a friction push fit, a snap fit, or a bayonet attachment, magnetic fit, or screw threads. The end cap 16 is provided at the front end of the battery portion 12. The end cap 16 may be made from translucent plastic or other translucent material to allow an LED 20 positioned near the end cap to emit light through the end cap. The end cap can be made of metal or other materials that do not allow light to pass.

An air inlet may be provided in the end cap, at the edge of the inlet next to the cylindrical hollow tube, anywhere along the length of the cylindrical hollow tube, or at the connection of the battery portion 12 and the atomizer/liquid reservoir portion 14. FIG. 1 shows a pair of air inlets 38 provided at the intersection between the battery portion 12 and the atomizer/liquid reservoir portion 14.

A battery 18, a light-emitting diode (LED) 20, control electronics 22 and optionally an airflow sensor 24 are provided within the cylindrical hollow tube battery portion 12. The battery 18 is electrically connected to the control electronics 22, which are electrically connected to the LED 20 and the airflow sensor 24. In this example the LED 20 is at the front end of the battery portion 12, adjacent to the end cap 16 and the control electronics 22 and airflow sensor 24 are provided in the central cavity at the other end of the battery 18 adjacent the atomizer/liquid reservoir portion 14.

The airflow sensor 24 acts as a puff detector, detecting a user puffing or sucking on the atomizer/liquid reservoir portion 14 of the e-cigarette 10. The airflow sensor 24 can be any suitable sensor for detecting changes in airflow or air pressure, such as a microphone switch including a deformable membrane which is caused to move by variations in air pressure. Alternatively the sensor may be a Hall element or an electro-mechanical sensor.

The control electronics 22 are also connected to an atomizer 26. In the example shown, the atomizer 26 includes a heating coil 28 which is wrapped around a wick 30 extending into a liquid reservoir 34 comprised by the atomizer/liquid reservoir portion 14. An air gap is provided on a side of the heating coil 28 enabling air to flow past the heating coil 28 and the wick 30. The atomizer may alternatively use other forms of heating elements, such as ceramic heaters, or fiber or mesh material heaters. Nonresistance heating elements such as sonic, piezo and jet spray may also be used in the atomizer in place of the heating coil.

A liquid reservoir 34 is disposed as well in the atomizer/liquid reservoir portion 14, the ends of the wick 30 abutting or extending into the liquid reservoir 34. The wick 30 may be a porous material such as a bundle of fiberglass fibers, with liquid in the liquid reservoir 34 drawn by capillary action from the ends of the wick 30 towards the central portion of the wick 30 encircled by the heating coil 28.

The liquid reservoir 34 may alternatively include wadding soaked in liquid, with the ends of the wick 30 abutting the wadding. In other embodiments the liquid reservoir 34 may comprise a toroidal cavity arranged to be filled with liquid and with the ends of the wick 30 extending into the toroidal cavity. In the electronic cigarette illustrated in FIG. 1 the liquid reservoir 34 is illustrated as abutting to the inner portion of the housing of the electronic cigarette. In one possible embodiment the liquid reservoir may be formed directly on the housing, the inner portion of the housing constituting a portion of the walls surrounding the liquid reservoir. In another possible embodiment, the liquid reservoir is enveloped by its own plurality of walls and said plurality of walls are not shared with the housing, but only abut against the inner portion of the housing. This embodiment is illustrated in FIG. 1. A portion of the housing and a portion of the wall enclosing the liquid reservoir exhibit a perforation that is capped with a flexible membrane 40. Membrane 40 is a non-permeable membrane at least in part pertaining to the casing of the liquid reservoir 34, providing a separation between the outside air and preventing said air to enter into the liquid reservoir 34 while preventing the liquid comprised by the liquid reservoir 34 to escape. The membrane 40 is arranged such that it complexly seals the perforation through the housing and through the walls of the electronic cigarette.

An air inhalation port 36 is provided at the back end of the atomizer/liquid reservoir portion 14 remote from the end cap 16. The inhalation port 36 may be formed from the cylindrical hollow tube atomizer/liquid reservoir portion 14 or maybe formed in an end cap.

In use, a user sucks on the e-cigarette 10. This causes air to be drawn into the e-cigarette 10 via one or more air inlets, such as air inlets 38, and to be drawn through the passage 32 towards the air inhalation port 36. The change in air pressure which arises is detected by the airflow sensor 24, which generates an electrical signal that is passed to the control electronics 22. In response to the signal, the control electronics 22 activate the heating coil 28, which causes liquid present in the wick 30 to be vaporized creating an aerosol (which may comprise gaseous and liquid components) within the passage 32. As the user continues to suck on the e-cigarette 10, this aerosol is drawn through the passage 32 and inhaled by the user. At the same time the control electronics 22 also activate the LED 20 causing the LED 20 to light up which is visible via the translucent end cap 16 mimicking the appearance of a glowing ember at the end of a conventional cigarette. As liquid present in the wick 30 is converted into an aerosol more liquid is drawn into the wick 30 from the liquid reservoir 34 by capillary action and thus is available to be converted into an aerosol through subsequent activation of the heating coil 28.

Some e-cigarettes are intended to be disposable and the electric power in the battery 18 is intended to be sufficient to vaporize the liquid contained within the liquid reservoir 34, after which the e-cigarette 10 is thrown away. In other embodiments the battery 18 is rechargeable and the liquid reservoir 34 is refillable. In the cases where the liquid reservoir 34 is a toroidal cavity, this may be achieved by refilling the liquid reservoir 34 via a refill port. In other embodiments the atomizer/liquid reservoir portion 14 of the e-cigarette 10 is detachable from the battery portion 12 and a new atomizer/liquid reservoir portion 14 can be fitted with a new liquid reservoir 34 thereby replenishing the supply of liquid. In some cases, replacing the liquid reservoir 34 may involve replacement of the heating coil 28 and the wick 30 along with the replacement of the liquid reservoir 34. A replaceable unit comprising the atomizer 26 and the liquid reservoir 34 is called a cartomizer.

The new liquid reservoir 34 may be in the form of a cartridge. In other embodiments, aerosol may flow around the exterior of the cartridge to an air inhalation port 36. In FIG. 1 the liquid reservoir is presented, for illustration purposes only, as a unicameral liquid reservoir. But as it will be discussed in detail in the following in this document, the liquid reservoir is not limited to being unicameral but may as well have multicameral embodiments.

Of course, in addition to the above description of the structure and function of a typical e-cigarette 10, variations also exist. For example, the LED 20 may be omitted. The airflow sensor 24 may be placed adjacent the end cap 16 rather than in the middle of the e-cigarette. The airflow sensor 24 may be replaced with a switch which enables a user to activate the e-cigarette manually rather than in response to the detection of a change in air flow or air pressure.

Different types of atomizers may be used. Thus for example, the atomizer may have a heating coil in a cavity in the interior of a porous body soaked in liquid. In this design aerosol is generated by evaporating the liquid within the porous body either by activation of the coil heating the porous body or alternatively by the heated air passing over or through the porous body. Alternatively the atomizer may use a piezoelectric atomizer to create an aerosol either in combination or in the absence of a heater.

Figure 2:
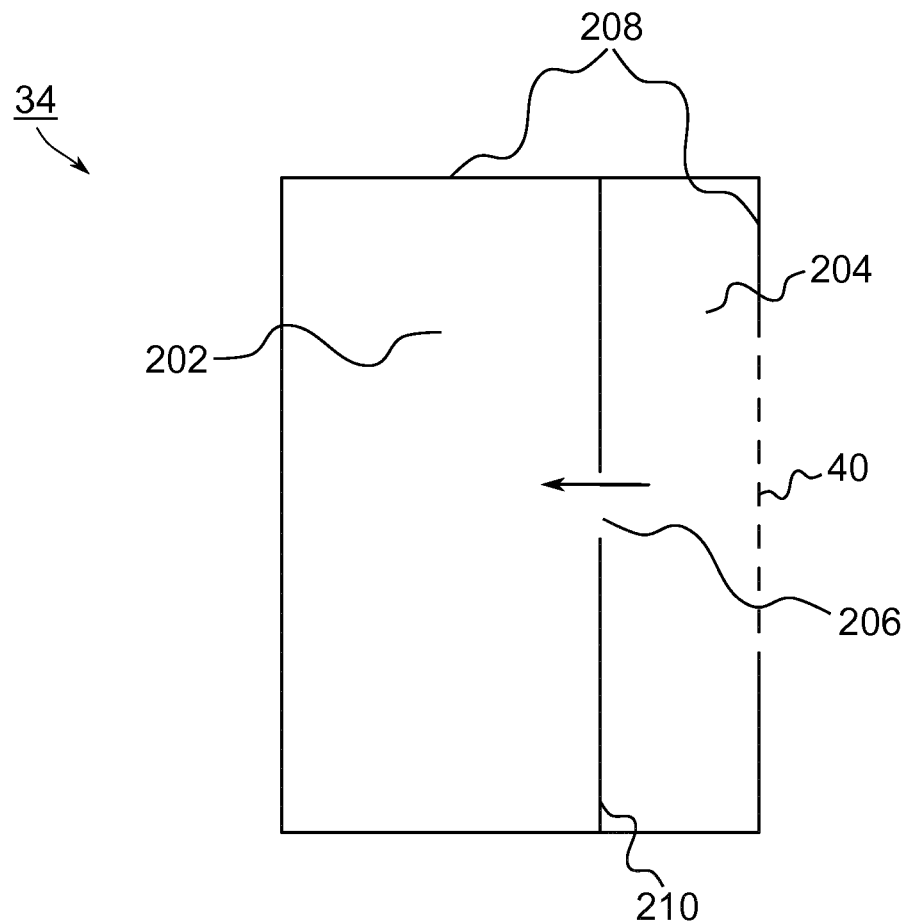
FIG. 2 is a schematic illustration of an exemplary embodiment of a multicameral liquid reservoir.

FIG. 2 is a schematic illustration of an exemplary embodiment of a multicameral liquid reservoir.

As illustrated in FIG. 2, the liquid reservoir 34 may be as well a liquid reservoir comprising more than one chamber, therefore a multicameral liquid reservoir. In the embodiment of the present invention illustrated in FIG. 2 the liquid reservoir 34 comprises a first chamber 202 and a second chamber 204. The first chamber 202 comprises a fluid that comprises nicotine and is a fluid that is neutral from the stand-point of flavor. This fluid is designated herewith as an unflavored fluid. The second chamber 204 comprises a fluid mixed with or comprising flavoring agents or additives. This fluid is designated herewith as a flavored fluid.

The additives may comprise compounds with a volatility higher than water and for example higher than the liquid to be atomized. For example, the compounds of the additive may have an evaporation number less than 10, less than 8, less than 5, less than 2.5, and for example of 8.3. Alternatively, the compounds of the additive may have an evaporation rate greater than 3, greater than 5 or greater than 8, for example an evaporation rate of 3.8.

Furthermore, the additive may comprise a flavored material and/or nicotine, wherein the flavored material and/or the nicotine exits the second chamber 204 at room temperature and under ambient pressure by evaporation without heating or other action of the atomizer 26.

The flavored materials are for example esters, such as isoamyl acetate, linalyl acetate, isoamyl propionate, linalyl butyrate and the like or natural essential oils as plant essential oils, such as spearmint, peppermint, *cassia*, jasmine and the like or animal essential oils, such as musk, amber, civet, castor and the like or simple flavoring materials, such as anethole, limonene, linalool, eugenol and the like or hydrophilic flavor components such as a leaf tobacco extract or natural plant flavoring materials such as licorice, St. John's wort, a plum extract, a peach extract and the like or acids such as a malic acid, tartaric acid, citric acid and the like or sugars such as glucose, fructose, isomerized sugar and the like or polyhydric alcohols such as propylene glycol, glycerol, sorbitol and the like. It is also possible to combine different flavored materials as mentioned above into new flavored materials. Moreover, it is possible to adsorb any flavor onto a solid material and to use this material as flavored material within an electronic smoking device according to the present invention.

Volatility is the tendency of a compound to become volatile/vaporized and it is directly related to the vapor pressure of said compound. At a given temperature and pressure, the volatility and, hence, vapor pressure of a compound is constant. The volatility of at least one and in particular of the flavor and/or of an aroma of the compounds of the additive may be provided with respect to the one of water, which may have a volatility of "1" and may be called evaporation number. A compound with a higher evaporation number than water has a higher vapor pressure than water—for example, at least one and in particular of the flavor and/or of the aroma compound of the compounds of the additive may have evaporation numbers between 3.8 and 10. In general, aroma compounds are highly volatile and this is the reason why we can smell them at room temperature. In case the flavor and/or the aroma compound has a volatility that is insufficient for the compound to be vaporized during use of the electronic smoking device, the flavor and/or of the aroma compound may be combined and for example mixed with another material with a sufficient volatility that entrains the flavor and/or of the aroma compound when the other material vaporizes.

The evaporation number may be defined as the ratio of time spent to completely evaporate a certain amount of solvent at 20° C. temperature and 65% relative humidity, to the time spent to completely evaporate the same amount of a reference solvent under same conditions. For example, diethyl ether or n-butyl acetate may be used as the reference solvent.

A plurality of walls 208 enclose both the first chamber 202 and the second chamber 204 within the liquid reservoir 34 to form the liquid reservoir.

The first chamber 202 and the second chamber 204 are disposed in the multicameral liquid reservoir 34 adjacent with each other, and are separated by an internal wall of the liquid reservoir 210, and are in communication with each other via an opening 206 in said internal wall 210. The plurality of walls 208 enclosing the two chambers are hard walls, that have in a portion surrounding the second chamber 204 a perforation. This perforation is capped with a flexible membrane 40. Membrane 40 is a non-permeable membrane at least in part pertaining to the casing of the liquid reservoir 34, providing a separation between the outside air and preventing said air to enter into the liquid reservoir 34, the second chamber 204, while preventing the liquid comprised by the second chamber 204 to escape. The membrane 40 is arranged such that it complexly seals the perforation through the housing and through the walls of the electronic cigarette. Membrane 40 is a deformable membrane which is caused to move by the user pressing on the membrane. Since the membrane 40 is capping both the perforation in the outer housing of the e-cigarette and the opening in the wall of the second chamber 204, the membrane is accessible to be actuated upon by the user from the outside of the electronic cigarette 10. The membrane 40 that constitutes a flexible portion of the wall 208 surrounding the second chamber 204 when pressed causes the flavored fluid from the second chamber 204 to migrate from the second chamber 204 into the first chamber 202 through opening 206. When the user presses the flexible membrane 40 an internal pressure of the flavored fluid in the second chamber 204 increases and as a result, the flavored fluid is caused to migrate from the second chamber 204 into the first chamber 202. The flavored fluid and the unflavored fluid mix close to the interface between the two fluids in the vicinity of opening 206. At least a portion of the wick 30, such as its end portions, is located inside the liquid present in cavity 202 such to drawn the liquid to the outside of the reservoir 34. In order to enable easy mixing, the end portions of wick 30 are located in the embodiment of the present invention in the proximity of the opening 206, such that they may draw mixed liquid, for example in the area close to the opening 206. A distance from the wick's end portions to the opening 206 may be preferably less than 80% of the maximum length of the first chamber 202, length that is measured from the wall 210 in the direction of the arrow to the leftmost reservoir wall 208 enclosing the first chamber. A distance from the wick's end portions to the opening 206 may be also preferably less than 60% of the maximum length of the first chamber 202. A distance from the wick's end portions to the opening 206 may be more preferably less than 40% of the maximum length of the first chamber 202. A distance from the wick's end portions to the opening 206 may be most preferably less than 20% of the maximum length of the first chamber 202.

A volume of the first chamber 202 is larger than a volume of the second chamber 204. In the embodiment of the invention illustrated in FIG. 2, when the user does not put pressure on the membrane 40 the flavored fluid is prevented to freely flow in the direction of the arrow illustrated in the figure due to the surface tension appearing at the opening 206. It is only upon exerting pressure upon the membrane in the opening 40 that the flavored fluid flows into the first chamber 202 moving in the direction of the arrow. The representation of the opening 206 is not made to scale in FIG. 206 and in the actual implementation of this embodiment of the present invention, its size is much smaller compared to the size of wall 210. As illustrated in FIG. 2 the chambers of reservoir 34 are oriented side by side versus each other, but other possible orientations are as well envisioned in connection with the present invention, for example the two chambers being oriented beneath or on top of each other. Such an embodiment of the present invention is described later in this document in connection with FIG. 5. Complete mixing of the flavored and unflavored fluids is avoided when using the opened opening 206 unless sufficient pressure is applied, perhaps via repeat actuations on the membrane 40, on the flavored fluid. As such the pressure in the chamber 204 increases up to a threshold value and when the threshold value is reached the flavored fluid of chamber 204 is able to overcome the surface tension present in opening 206 and pass into chamber 202 where it mixes with the unflavored fluid.

Figure 3:
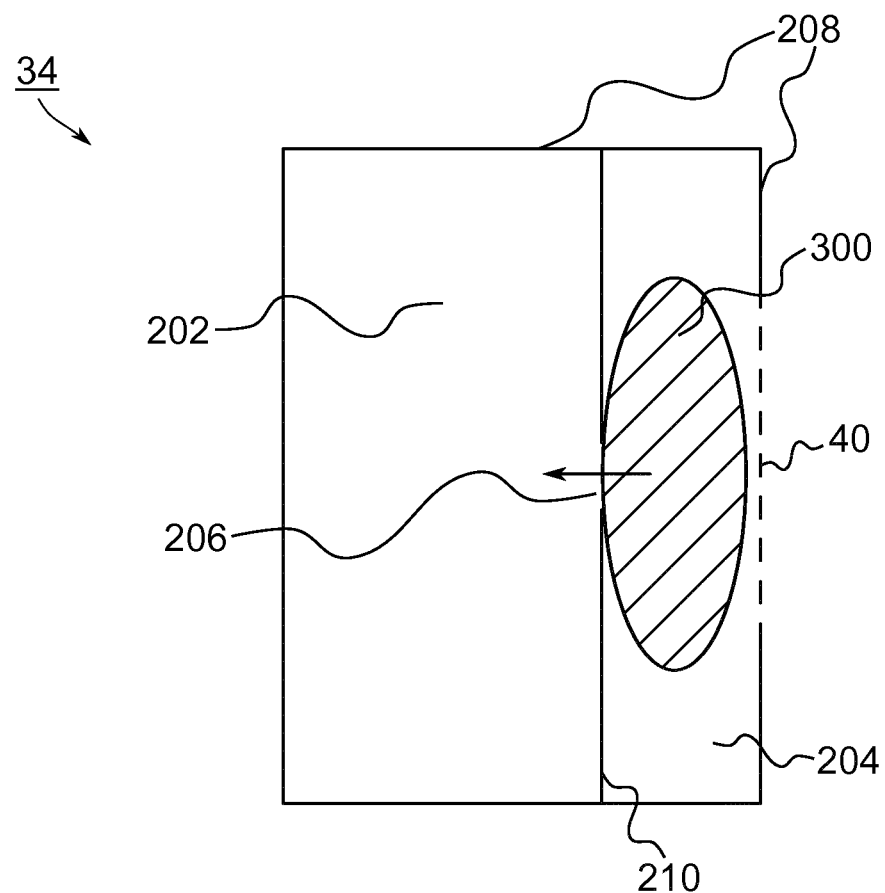
FIG. 3 is also a schematic illustration of a multicameral liquid reservoir in accordance with an embodiment of the present invention, comprising a capsule with flavored fluid.

FIG. 3 is a schematic illustration of a multicameral liquid reservoir in accordance with an embodiment of the present invention, comprising a capsule with flavored fluid.

As discussed above in connection with FIG. 2, a multichameral liquid reservoir 34 may comprise a second chamber 204 filled with a flavored liquid. In the embodiment illustrated in FIG. 3, the flavored fluid does not occupy the entire volume of the second chamber 204, as it is the case in the embodiment of the invention illustrated in FIG. 2, but the flavored fluid is enclosed in a capsule 300 that is disposed within the second chamber 204.

Further, in this example, the unflavored fluid of the first chamber 202 may occupy only the first chamber or may might occupy as well the volume of the second chamber 204, not occupied by capsule 300.

Capsule 300 is a soft capsule comprising a membrane enclosing the flavored fluid. The capsule 300 is disposed within the second chamber 204 between the flexible portion 40 and the opening 206 between the two chambers of the fluid reservoir 34 so that it is accessible to be pressed upon by a user when the user actuates membrane 40. The membrane of capsule 300 is made of a material that is easy to break when a relatively low pressure is applied on the capsule via the flexible portion 40 that is in direct contact with the capsule 300. Upon breaking the capsule 300 the flavored fluid comprised in the capsule diffuses into the unflavored fluid available in the first chamber 202 by flowing in the direction of the arrow, especially if continued pressure is applied upon the flexible membrane 40 by the user. As a result, the entire volume of the unflavored fluid is flavored with the same flavor available from capsule 300 and an intense flavor is available to the user. As explained as well in connection with FIG. 2, the flavored fluid and the unflavored fluid mix close to the interface between the two fluids in the vicinity of opening 206. At least a portion of the wick 30, such as its end portions, is located inside the liquid present in cavity 202 such to drawn the liquid to the outside of the reservoir 34. In order to enable easy mixing, the end portions of wick 30 are located in this embodiment of the present invention such that they may draw mixed liquid, for example in the area close to the opening 206. A distance from the wick's end portions to the opening 206 may be preferably less than 80% of the maximum length of the first chamber 202, length that is measured from the wall 210 in the direction of the arrow to the leftmost reservoir wall 208 enclosing the first chamber. A distance from the wick's end portions to the opening 206 may be also preferably less than 60% of the maximum length of the first chamber 202. A distance from the wick's end portions to the opening 206 may be more preferably less than 40% of the maximum length of the first chamber 202. A distance from the wick's end portions to the opening 206 may be most preferably less than 20% of the maximum length of the first chamber 202.

Figure 4:
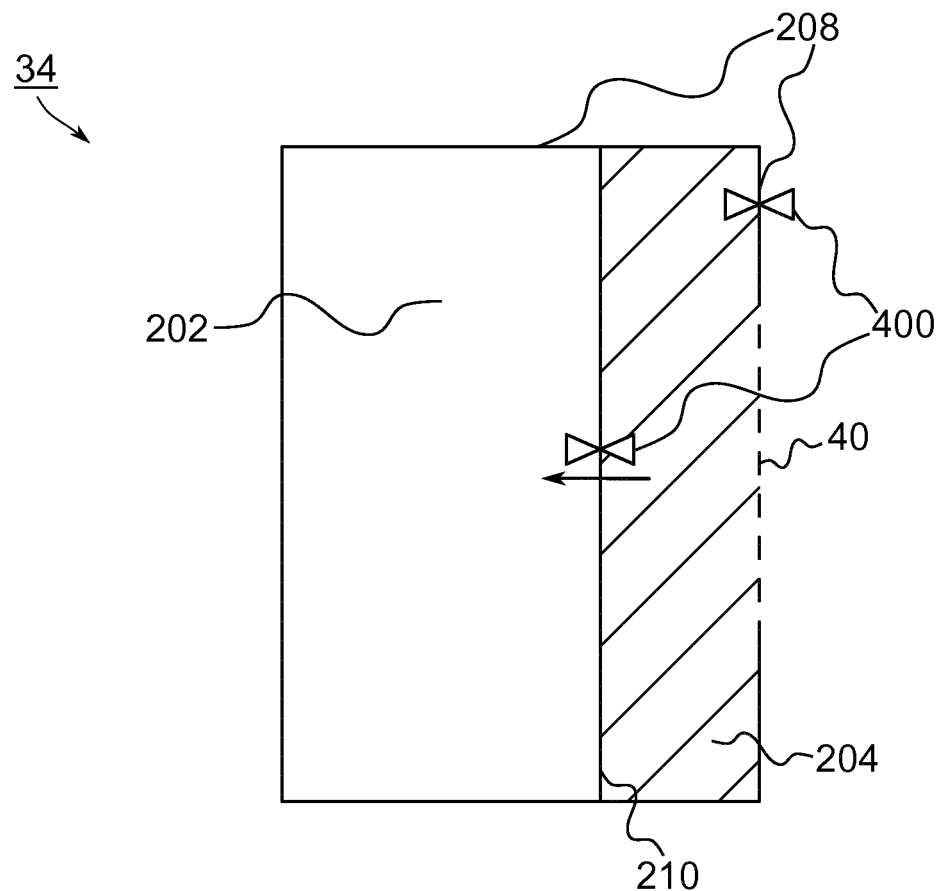
FIG. 4 is a further schematic illustration of an exemplary embodiment of a multicameral liquid reservoir in accordance with the present invention.

FIG. 4 is a further schematic illustration of an exemplary embodiment of a multicameral liquid reservoir in accordance with the present invention.

The multicameral reservoir 34 illustrated in FIG. 4 comprises all the elements of the reservoir described in connection with FIG. 2 except the opening 206. Instead this embodiment of the reservoir 34 exhibits between the first chamber 202 and the second chamber 204 a valve 400 installed in said opening. A further valve 400 is installed in a wall of the second chamber 204, preferably so that it has access to the outside of the electronic cigarette. The two valves may be different or may be the same in nature. If a user presses upon membrane 40, a pressure of the flavored fluid present in the second chamber increases and if it has increased sufficiently the flavored fluid migrates from the second chamber 204 to the first chamber. Upon the user depressing the membrane 40 the second valve installed in the wall of the second chamber allows the pressure from inside the second chamber to equalize with the pressure of outside the reservoir by facilitating air exchange between the outside the reservoir into the second chamber. The first and the second valves 400 may both be unidirectional valves. Alternatively, the first valve is a bidirectional pin valve while the first valve is a unidirectional valve. The reservoir 34 of FIG. 4 permits the input of a controlled amount of flavor in the first chamber 202 and if the user wishes to experience a more intense flavor, the user may continue to press the flexible membrane till the desired flavor intensity in chamber 202 is reached. In the embodiment of the invention illustrated in FIG. 4, at least a portion of the wick 30, such as its end portions, is located inside the liquid present in cavity 202 such to drawn the liquid to the outside of the reservoir 34. In order to enable easy mixing, the end portions of wick 30 are located in the embodiment of the present invention such that they may draw mixed liquid, for example in the area close to the valve 400 situated between chambers 202 and 204. A distance from the wick's end portions to the valve 400 may be preferably less than 80% of the maximum length of the first chamber 202, length that is measured from the wall 210 in the direction of the arrow to the leftmost reservoir wall 208 enclosing the first chamber. A distance from the wick's end portions to the valve 400 may be also preferably less than 60% of the maximum length of the first chamber 202. A distance from the wick's end portions to the valve 400 may be more preferably less than 40% of the maximum length of the first chamber 202. A distance from the wick's end portions to the valve 400 may be most preferably less than 20% of the maximum length of the first chamber 202.

Figure 5:
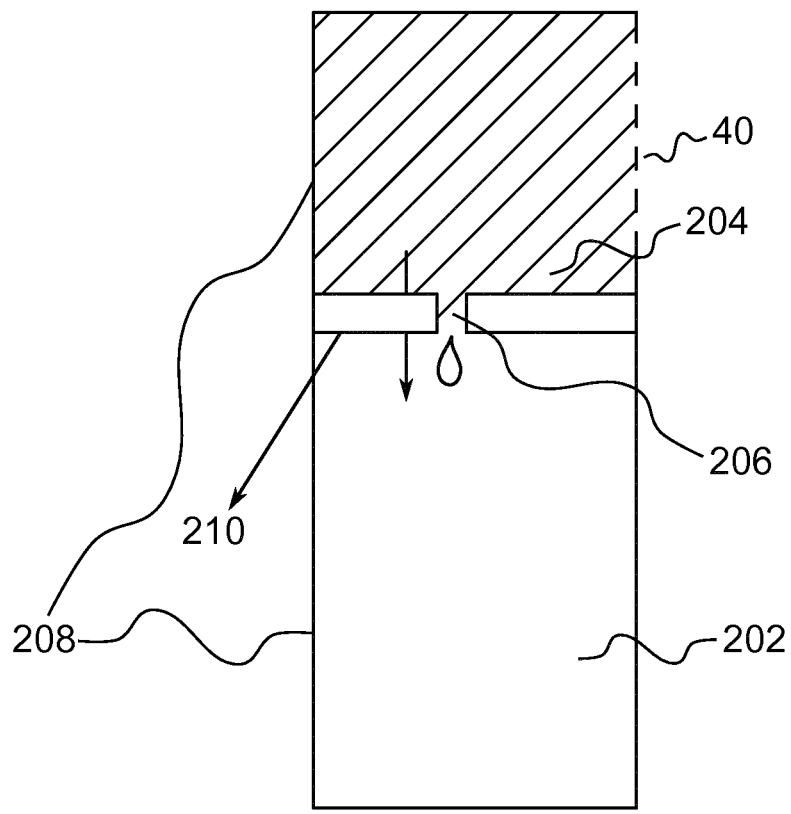
FIG. 5 is a further yet schematic illustration of an exemplary embodiment of a multicameral liquid reservoir in accordance with the present invention.

FIG. 5 is a further yet schematic illustration of an exemplary embodiment of a multicameral liquid reservoir in accordance with the present invention.

The multicameral reservoir 34 of FIG. 5 has all the elements explained above in connection with FIG. 2 but their relative disposition varies versus the embodiment illustrated in FIG. 2. In the embodiment of FIG. 5 the second chamber 204 is disposed on top of the first chamber 202 so that when the membrane 40 is acted upon by a user, the increased pressure in the second chamber 204 and the gravity are responsible for pushing the flavored fluid from the second chamber 204 in the direction of the arrow towards the first chamber 202 through opening 206. In the embodiment of the invention present in FIG. 5 the opening 206 is a capillary opening. The flow of the flavored fluid from the second chamber 204 into the first chamber is a dripping flow. In the embodiment of the invention illustrated in FIG. 5, at least a portion of the wick 30, such as its end portions, is located inside the liquid present in cavity 202 such to drawn the liquid to the outside of the reservoir 34. In order to enable easy mixing, the end portions of wick 30 are located in this embodiment of the present invention such that they may draw mixed liquid, for example in the area close to the capillary opening 206 situated between chambers 202 and 204. A distance from the wick's end portions to the opening 206 may be preferably less than 80% of the maximum length of the first chamber 202, length that is measured from the wall 210 in the direction of the arrow to the bottom-most reservoir wall 208 enclosing the first chamber. A distance from the wick's end portions to the opening 206 may be also preferably less than 60% of the maximum length of the first chamber 202. A distance from the wick's end portions to the opening 206 may be more preferably less than 40% of the maximum length of the first chamber 202. A distance from the wick's end portions to the opening 206 may be most preferably less than 20% of the maximum length of the first chamber 202.

Figure 6:
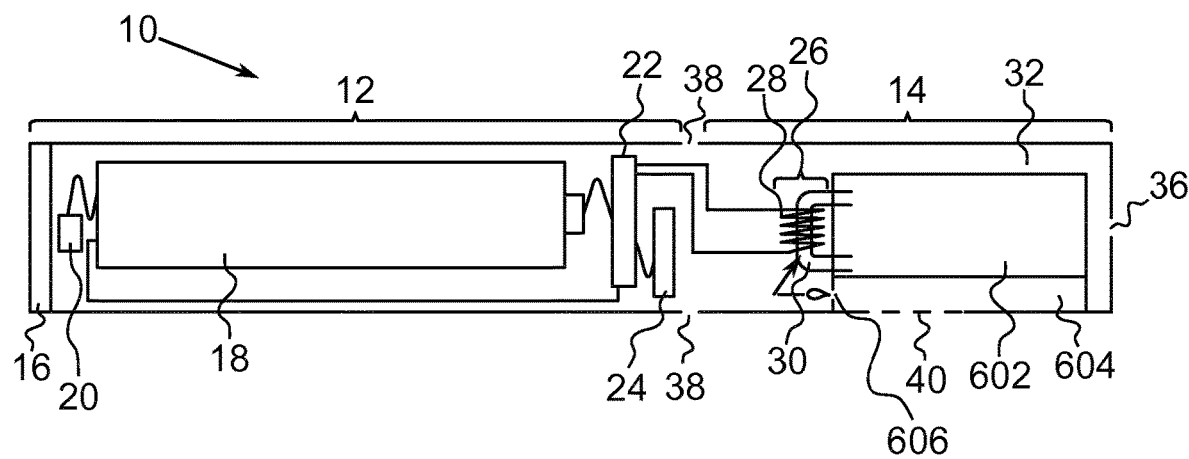
FIG. 6 is a schematic cross-sectional illustration of an e-cigarette with a multicameral liquid reservoir in accordance with the present invention.

FIG. 6 is a schematic cross-sectional illustration of an e-cigarette with a multicameral liquid reservoir in accordance with the present invention.

The electronic cigarette of FIG. 6 has all the same elements described above in connection with the electronic cigarette of FIG. 1, with the exception of reservoir 34. The electronic cigarette 10 of FIG. 6 is outfitted with a unicameral reservoir for the unflavored liquid, denoted in FIG. 6 with 602 and with a second reservoir 604 comprising flavored fluid. The two reservoirs 602 and 604 are not in direct communication with each other and may be disposed such, in the inside space of the electronic cigarette, that they share or do not share a common wall. The end of wick 30 extends into reservoir 602. Upon depressing by the user of membrane 40, that delimits among others the reservoir 604, a drip or a spray of flavored fluid is liberated from reservoir 604 via opening 606 and progresses in the direction of the arrow and is received either by the portion of the wick 30 that is not immersed in reservoir 602 or directly by the coil 28. As such the flavored fluid is evaporated together with the unflavored fluid and the vapors mix in the passage 32. The dripping may occur directly on the wick or in the close proximity of the wick 30. As a result flavor may be experienced shortly after pressing the membrane 40 but in a controlled quantify sufficient only for a few puffs. In one embodiment, the opening 606 is positioned such that the drips of flavored fluid reach the wick (beneath the coil 28 but outside the reservoir 34) such that the flavored fluid firstly goes into the wick, mixes with the unflavored fluid drawn from the reservoir 34 and the mixed fluid is then evaporated by 28. Alternatively, the opening 606 is positioned such that the drips (of reservoir 604) of flavored fluid are directly spayed onto the coil 28 such that they are evaporated together with the unflavored fluid (being drawn by the wick 30 from the reservoir 602) without prior mixing.

As presented above in connection with the various embodiments of the invention, flavor may be easily added to the unflavored fluid of an electronic cigarette. In one embodiment of the invention, by pressing the membrane 40 the whole liquid present in a second chamber may be added to the liquid in the first chamber to create an intense flavor. Alternatively, by pressing the membrane 40 flavor will be added for only one puff or a defined amount of puffs. As such the solutions proposed by the present invention make it possible, while using the same electronic cigarette and the same cartridge to vapor fluid with and without flavor and customize as desired the smoking experience.

In summary, in one aspect the electronic smoking device has a battery portion comprising a battery, an atomizer/liquid reservoir portion comprising a multicameral liquid reservoir, and an atomizer operable when connected to the battery to atomize liquid stored in the multicameral liquid reservoir. The multicameral liquid reservoir comprises a first chamber comprising an unflavored fluid, a second chamber comprising a flavored fluid, the first chamber and the second chamber being disposed in communication with each other via an opening, and a plurality of reservoir walls enclosing the two chambers. A portion of the plurality of reservoir walls enclosing the second chamber comprising a flexible portion, the flexible portion when acted upon causing the flavored fluid to migrate from the second chamber to the first chamber through the opening.

In accordance with another aspect of the invention is provided an atomizer/liquid reservoir portion, comprising a multicameral liquid reservoir, and an atomizer operable when connected to a battery of an electronic cigarette to atomize liquid stored in the multicameral liquid reservoir. The multicameral liquid reservoir comprises a first chamber comprising an unflavored fluid, a second chamber comprising a flavored fluid, the first chamber and the second chamber being disposed in communication with each other via an opening, and a plurality of reservoir walls enclosing the two chambers. A portion of the plurality of reservoir walls enclosing the second chamber comprising a flexible portion, the flexible portion when acted upon causing the flavored fluid to migrate from the second chamber to the first chamber through the opening.

According to an embodiment, when acting upon the flexible portion an internal pressure of the flavored fluid is increased causing the flavored fluid to migrate from the second chamber to the first chamber. A volume of the first chamber is larger than a volume of the second chamber. The flexible portion forms an outside portion of the atomizer/liquid reservoir portion of the electronic cigarette.

According to another embodiment, the second chamber comprises a capsule comprising flavored fluid, and the capsule being adapted to break due to pressure exerted upon the capsule via the flexible portion. The capsule is disposed within the second chamber between the flexible portion of the plurality of reservoir walls and the opening.

According to a further embodiment, the opening comprises a first valve. A portion of the plurality of walls enclosing the second chamber comprise a second valve. The second valve may be a unidirectional valve capable of functioning as an air inlet, and the first valve may be a unidirectional valve. Alternatively, the first valve is a bidirectional pin hole valve.

According to a further yet embodiment, the atomizer comprises a heating coil and a wick, the wick being disposed in the proximity of the opening between the first and second chambers.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS 10 electronic smoking device
12 battery portion
14 atomizer/liquid reservoir portion
16 end cap
18 battery
20 light-emitting diode (LED)
22 control electronics
24 airflow sensor
26 atomizer
28 heating coil
30 wick
32 passage
34 multicameral liquid reservoir 36 air inhalation port
38 air inlets
40 flexible portion
202 a first chamber
204 a second chamber
206 opening
208 a plurality of reservoir walls
300 capsule
400 valves
602 reservoir with unflavored fluid
604 reservoir with flavored fluid
606 opening

The invention claimed is:

1. An electronic cigarette (10), comprising:
   a battery portion (12) comprising a battery (18),
   an atomizer/liquid reservoir portion (14) comprising a multicameral liquid reservoir (34), and an atomizer (26) operable when connected to the battery (18) to atomize liquid stored in the multicameral liquid reservoir (34), wherein said multicameral liquid reservoir (34) comprising:
      a first chamber (202) comprising an unflavored fluid,
      a second chamber (204) comprising a flavored fluid,
      said first chamber (202) and said second chamber (204) disposed in communication with each other via an opening (206), and
      a plurality of reservoir walls (208) enclosing said first (202) and second (204) chamber,
      wherein a portion of said plurality of reservoir walls (208) enclosing said second chamber (204) comprising a flexible portion (40), said flexible portion (40) when acted upon causing said flavored fluid to migrate from the second chamber (204) to the first chamber (202) through said opening (206).

2. The electronic cigarette (10) of claim 1, wherein when acting upon said flexible portion (40) an internal pressure of said flavored fluid is increased causing said flavored fluid to migrate from the second chamber (204) to the first chamber (202).

3. The electronic cigarette (10) of claim 1, wherein a volume of said first chamber (202) is larger than a volume of said second chamber (204).

4. The electronic cigarette (10) of claim 1, wherein said flexible portion (40) forming an outside portion of said atomizer/liquid reservoir portion (14) of the electronic cigarette (10).

5. The electronic cigarette (10) of claim 1, wherein said second chamber (204) comprising a capsule (300) comprising said flavored fluid, and wherein said capsule (300) is adapted to break due to pressure exerted upon the capsule (300) via said flexible portion (40).

6. The electronic cigarette (10) of claim 5, wherein the capsule (300) is disposed within said second chamber (204) between said flexible portion (40) of said plurality of reservoir walls (208) and said opening (206).

7. The electronic cigarette (10) of claim 1, wherein said opening (206) comprising a first valve (400).

8. The electronic cigarette (10) of claim 1, wherein a portion of said plurality of walls (208) enclosing said second chamber (208) comprising a second valve (400).

9. The electronic cigarette (10) of claim 8, wherein said second valve (400) is a unidirectional valve capable of functioning as an air inlet.

10. The electronic cigarette (10) of claim 7, wherein said first valve (400) is a unidirectional valve.

11. The electronic cigarette (10) of claim 7, wherein said first valve (400) is a bidirectional pin hole valve.

12. The electronic cigarette (10) of claim 7, wherein the atomizer (26) comprising a heating coil (28) and a wick (30), and wherein said wick (30) is disposed in the proximity of the opening (206) between said first (202) and second chambers (204).

13. An atomizer/liquid reservoir portion (14), comprising:
    a multicameral liquid reservoir (34), and
    an atomizer (26) operable when connected to a battery (18) of an electronic cigarette (10) to atomize liquid stored in the multicameral liquid reservoir (34), wherein the multicameral liquid reservoir (34) comprising:
       a first chamber (202) comprising an unflavored fluid,
       a second chamber (204) comprising a flavored fluid,
       said first chamber (202) and said second chamber (202) disposed in communication with each other via an opening (206), and
       a plurality of reservoir walls (208) enclosing said first (202) and second chamber (204),
       wherein a portion of said plurality of reservoir walls (208) enclosing said second chamber (204) comprising a flexible portion (40), said flexible portion (40) when pressed causing said flavored fluid to migrate from the second chamber (204) to the first chamber (202) through said opening (206).

14. The atomizer/liquid reservoir portion (14) of claim 13, wherein when pressing said flexible portion (40) an internal pressure of said flavored fluid is increased causing said flavored fluid to migrate from the second chamber (204) to the first chamber (202).

15. The atomizer/liquid reservoir portion (14) of claim 13, wherein said flexible portion (40) forming an outside portion of said atomizer/liquid reservoir portion (14) of electronic cigarette (10).

* * * * *